United States Patent
Takai et al.

(10) Patent No.: US 12,338,535 B2
(45) Date of Patent: Jun. 24, 2025

(54) YTTRIUM-BASED SPRAYED COATING AND MAKING METHOD

(71) Applicant: Shin-Etsu Chemical Co., Ltd., Tokyo (JP)

(72) Inventors: Yasushi Takai, Tokyo (JP); Noriaki Hamaya, Echizen (JP)

(73) Assignee: SHIN-ETSU CHEMICAL CO., LTD., Tokyo (JP)

( * ) Notice: Subject to any disclaimer, the term of this patent is extended or adjusted under 35 U.S.C. 154(b) by 0 days.

(21) Appl. No.: 18/381,485

(22) Filed: Oct. 18, 2023

(65) Prior Publication Data

US 2024/0043983 A1  Feb. 8, 2024

Related U.S. Application Data (62) Division of application No. 15/220,652, filed on Jul. 27, 2016, now abandoned.

(30) Foreign Application Priority Data

Jul. 31, 2015  (JP) .................................. 2015-151568

(51) Int. Cl.
 *C23C 4/04* (2006.01)
 *C09D 1/00* (2006.01)
 (Continued)

(52) U.S. Cl.
 CPC ................. *C23C 4/04* (2013.01); *C09D 1/00* (2013.01); *C23C 4/06* (2013.01); *C23C 4/11* (2016.01); *C23C 4/18* (2013.01); *C23C 4/185* (2013.01)

(58) Field of Classification Search
 CPC .. C23C 4/04; C23C 4/11; C23C 4/185; C09D 1/00
 See application file for complete search history.

(56) References Cited

U.S. PATENT DOCUMENTS 6,071,616 A  6/2000  Sulzbach et al.
6,402,851 B1  6/2002  Piltingsrud
(Continued)

FOREIGN PATENT DOCUMENTS

JP  62-277755 A  12/1987
JP  3523222 B2  4/2004
(Continued)

OTHER PUBLICATIONS

Office Action dated May 22, 2018, issued in counterpart Japanese Application No. 2015-151568, with English machine translation. (11 pages).
(Continued)

*Primary Examiner* — Nathan T Leong
(74) *Attorney, Agent, or Firm* — WHDA, LLP (57) ABSTRACT

An yttrium-base sprayed coating is obtained by thermally spraying yttrium oxide, yttrium fluoride or yttrium oxyfluoride onto a substrate to form a coating of 10-500 μm thick, and chemically cleaning the coating with a cleaning liquid of organic acid, inorganic acid or a mixture thereof until the population of particles with a size of up to 300 nm becomes no more than 5 particles/mm² of the coating surface. The yttrium-base sprayed coating exhibits high corrosion resistance even in a halogen gas plasma atmosphere and prevents yttrium-base particles from spalling off during etching treatment.

4 Claims, 6 Drawing Sheets

(51) Int. Cl.
*C23C 4/06* (2016.01)
*C23C 4/11* (2016.01)
*C23C 4/18* (2006.01)

(56) References Cited

U.S. PATENT DOCUMENTS

| | | | |
|---|---|---|---|
| 6,685,991 | B2 | 2/2004 | Wataya et al. |
| 6,852,433 | B2 | 2/2005 | Maeda |
| 8,349,450 | B2 | 1/2013 | Ibe et al. |
| 2005/0084654 | A1 | 4/2005 | Takahashi et al. |
| 2007/0026246 | A1 | 2/2007 | Harada et al. |
| 2008/0274333 | A1 | 11/2008 | Iwasawa et al. |
| 2009/0029060 | A1 | 1/2009 | Kanai et al. |
| 2009/0191429 | A1 | 7/2009 | Maeda et al. |
| 2009/0214825 | A1 | 8/2009 | Sun et al. |
| 2013/0122218 | A1* | 5/2013 | Maeda ............... H01L 21/67069 427/353 |
| 2013/0202990 | A1 | 8/2013 | Jindal et al. |
| 2016/0254125 | A1 | 9/2016 | Huang et al. |
| 2017/0029628 | A1 | 2/2017 | Takai et al. |

FOREIGN PATENT DOCUMENTS

| | | | |
|---|---|---|---|
| JP | 2007-247043 | A | 9/2007 |
| JP | 4006596 | B2 | 11/2007 |
| JP | 2008-133528 | A | 6/2008 |
| JP | 2008-172016 | A | 7/2008 |
| JP | 2009-174000 | A | 8/2009 |
| JP | 4591722 | B2 | 12/2010 |
| JP | 2011-514933 | A | 5/2011 |
| JP | 2013-147679 | A | 8/2013 |
| JP | 2014-40634 | A | 3/2014 |

OTHER PUBLICATIONS

Non-Final Office Action dated Jun. 15, 2017, issued in U.S. Appl. No. 15/220,652. (13 pages).
ccdef.com, "Vinegar", retrieved May 9, 2018, pp. 1-7. Non-Final Office Action dated May 15, 2018 in U.S. Appl. No. 15/600,953.
Non-Final Office Action dated May 15, 2018, issued in U.S. Appl. No. 15/600,953. (19 pages).
Final Office Action dated Jan. 9, 2018, issued in U.S. Appl. No. 15/220,652. (9 pages).
Non-Final Office Action dated Aug. 10, 2018, issued in U.S. Appl. No. 15/220,652. (9 pages).
Final Office Action dated Jul. 9, 2019, issued in U.S. Appl. No. 15/220,652. (10 pages).
Non-Final Office Action dated May 15, 2020, issued in U.S. Appl. No. 15/220,652 (10 pages).
Non-Final Office Action dated Mar. 10, 2021, issued in U.S. Appl. No. 15/220,652 (13 pages; in English).
Non-Final Office Action dated Nov. 1, 2021, issued in U.S. Appl. No. 15/220,652 (14 Pages; In English).
Final Office Action dated Feb. 22, 2021, issued in U.S. Appl. No. 15/600,953 (31 pages).
Non-Final Office Action dated Jun. 5, 2020, issued in U.S. Appl. No. 15/600,953 (28 pages).

\* cited by examiner

YTTRIUM-BASED SPRAYED COATING AND MAKING METHOD

CROSS-REFERENCE TO RELATED APPLICATION

This application is a divisional application of U.S. application Ser. No. 15/220,652 filed on Jul. 27, 2016 which claims a priority to Japanese application No. 2015-151568 filed on Jul. 31, 2015, the entire disclosures of which are hereby incorporated herein by reference.

TECHNICAL FIELD

This invention relates to an yttrium-base sprayed coating formed by thermally spraying yttrium oxide, yttrium fluoride and/or yttrium oxyfluoride, which is suited as a low dusting coating on parts and articles used in a corrosive plasma atmosphere as encountered in a semiconductor device fabrication process.

BACKGROUND ART

In the prior art process for manufacturing semiconductor devices, treatment is often carried out in a corrosive halogen-base gas plasma atmosphere. Typical corrosive halogen-base gases are fluorine-base gases such as $SF_6$, $CF_4$, $CHF_3$, $ClF_3$, and HF and chlorine-base gases such as $Cl_2$, $BCl_3$ and HCl. The equipment used for such treatment typically includes parts or components having corrosion resistant coatings on their surface. For example, parts or components having coatings formed by spraying yttrium oxide (Patent Document 1) and yttrium fluoride (Patent Documents 2 and 3) to the surface of metallic aluminum and aluminum oxide ceramic substrates are known to be fully corrosion resistant and used in practice.

As the current semiconductor technology aims at higher integration, the size of interconnections is approaching to nm or less. In the device fabrication process, yttrium-base particles may spall off the surface of yttrium-base coatings on the parts during etching treatment and fall onto silicon wafers to interfere with the etching treatment. This causes to reduce the manufacture yield of semiconductor devices. There is a tendency that the number of yttrium-base particles spalling off the yttrium-base coating surface is high at the early stage of etching treatment and decreases with the lapse of etching time. Patent Documents 4 and 5 relating to the spraying technology are also incorporated herein by reference.

CITATION LIST

Patent Document 1: JP 4006596 (U.S. Pat. No. 6,852,433)
Patent Document 2: JP 3523222 (U.S. Pat. No. 6,685,991)
Patent Document 3: JP-A 2011-514933 (US 20090214825)
Patent Document 4: JP-A 2008-133528 (U.S. Pat. No. 8,349,450)
Patent Document 5: JP 4591722 (US 20130122218)

DISCLOSURE OF INVENTION

An object of the invention is to provide an yttrium-base sprayed coating which is formed by thermally spraying one or more compounds selected from among yttrium oxide, yttrium fluoride, and yttrium oxyfluoride, capable of substantially preventing yttrium-base particles from spalling off the coating surface during etching or similar treatment, and thus suited for use as a low dusting coating on parts or articles used in a corrosive plasma atmosphere during the semiconductor device fabrication process.

When a coating of yttrium oxide, yttrium fluoride or yttrium oxyfluoride is formed by plasma spraying, a particulate material is melted in a plasma flame into droplets, after which droplets deposit and solidify on a substrate to form a coating. If the size of material particles is too small, some particles may not enter the flame, but deposit on the coating in the unmelted state. Also, once particles are melted, sometimes droplets may burst on the coating into finer droplets, which will deposit on the coating as finer particles. Such fine (unmelted or burst) particles which deposit on the coating surface in the course of spraying are covered with the following droplets and thus integrated into a dense coating, whereas foreign particles which deposit on the coating surface near the end of spraying remain bonded as such. It is difficult to remove the bonded particles by ultrapure water cleaning, ultrasonic cleaning or the like. If fine particles spall off during etching treatment, they become a source of dusting. Patent Document proposes physical removal of sticky particles (i.e., particles which are not removable by ultrapure water cleaning or ultrasonic cleaning) by polishing or blasting. However, physical removal such as polishing is not so effective because the treatment itself generates fine particles.

The inventors have found that an improved yttrium-base sprayed coating is obtained by thermally spraying one or more compounds selected from among yttrium oxide, yttrium fluoride, and yttrium oxyfluoride to form a coating of 10 to 500 μm thick, and chemically cleaning the coating with a cleaning liquid in the form of an aqueous solution of organic acid or inorganic acid or a mixture thereof for effectively removing yttrium-base particles anchored to the coating surface until the population of particles having a size of up to 300 nm becomes no more than 5 particles/mm$^2$ of the coating surface. Since the resulting yttrium-base sprayed coating prevents yttrium-base particles from spalling off to cause a failure during subsequent etching treatment, it is suitable for use as a low dusting coating on parts and articles used in a corrosive plasma atmosphere in the semiconductor device fabrication process.

In one aspect, the invention provides an yttrium-base sprayed coating comprising one or more compounds selected from the group consisting of yttrium oxide, yttrium fluoride, and yttrium oxyfluoride and having a thickness of 10 to 500 μm, wherein particles with a size of up to 300 nm are present on a coating surface in a population of no more than 5 particles per square millimeters.

Preferably the yttrium-base sprayed coating has a thickness of 80 to 400 μm.

Typically the yttrium-base sprayed coating is sprayed onto a surface of a substrate of metallic aluminum, aluminum oxide or metallic silicon.

In another aspect, the invention provides a method for preparing a yttrium-base sprayed coating, comprising the steps of thermally spraying a particulate spray material comprising at least one compound selected from the group consisting of yttrium oxide, yttrium fluoride, and yttrium oxyfluoride to form a yttrium-base sprayed coating having a thickness of 10 to 500 μm and chemically cleaning a surface of the coating with a cleaning liquid which is an organic acid aqueous solution, inorganic acid aqueous solution or organic acid/inorganic acid aqueous solution until a population of particles with a size of up to 300 nm is no more than 5 particles per square millimeters of the coating surface.

The cleaning liquid is preferably an aqueous solution of an acid selected from the group consisting of a monofunctional carboxylic acid, difunctional carboxylic acid, trifunctional carboxylic acid, hydroxy acid, sulfonic acid, nitric acid, sulfuric acid, carbonic acid, hydrofluoric acid, and acidic ammonium fluoride or a mixture thereof. Typically, the monofunctional carboxylic acid is formic acid or acetic acid, the difunctional carboxylic acid is maleic acid, tartaric acid or phthalic acid, the trifunctional carboxylic acid is citric acid, the hydroxy acid is lactic acid, and the sulfonic acid is methanesulfonic acid.

In a preferred embodiment, the chemical cleaning step includes immersing the yttrium-base sprayed coating in the cleaning liquid to dissolve the coating to a depth of at least 0.01 μm from its surface for thereby removing particles with a size of up to 300 nm on the coating surface.

Advantageous Effects of Invention

The yttrium-base sprayed coating of the invention exhibits high corrosion resistance during treatment in a corrosive halogen-base gas plasma atmosphere, and prevents dusting as a result of yttrium-base particles spalling off during etching or similar treatment in the semiconductor device fabrication process, which is effective for improving the fabrication yield of semiconductor devices. The yttrium-base sprayed coating is thus suitable for use as a low dusting coating on parts and articles which are exposed to a corrosive plasma atmosphere.

DESCRIPTION OF PREFERRED EMBODIMENTS

The yttrium-base sprayed coating of the invention is formed by thermally spraying one or more compounds selected from among yttrium oxide, yttrium fluoride, and yttrium oxyfluoride.

Thermal spraying to a substrate is desirably atmospheric plasma spraying or vacuum plasma spraying. The plasma gas used herein may be nitrogen/hydrogen, argon/hydrogen, argon/helium, argon/nitrogen, argon alone, or nitrogen gas alone, but not limited thereto. Examples of the substrate subject to thermal spraying include, but are not limited to, substrates of stainless steel, aluminum, nickel, chromium, zinc, and alloys thereof, metal silicon, aluminum oxide, aluminum nitride, silicon nitride, silicon carbide, and quartz glass when parts or components of the semiconductor fabrication equipment are contemplated. The conditions under which yttrium oxide, yttrium fluoride or yttrium oxyfluoride is thermally sprayed are not particularly limited. The thermal spraying conditions may be determined as appropriate depending on the identity of substrate, the particle size and composition of spray material, and a particular application of the resulting sprayed component.

For example, when an yttrium oxide coating is formed on a metal aluminum substrate, it may be deposited by argon/hydrogen atmospheric plasma spraying using yttrium oxide powder having an average particle size D50 of about 20 μm and a gas mixture of 40 L/min of argon and 5 L/min of hydrogen. The thermal spraying conditions including a spray distance, current value and voltage value may be determined as appropriate depending on a particular application of the sprayed component. Likewise, the feed rates of argon and hydrogen gases may be suitably adjusted.

The sprayed coating, i.e., yttrium-base sprayed coating should have a thickness of 10 to 500 μm. A coating of less than 10 μm thick may be less corrosion resistant or allow the substrate surface to be partly exposed in the cleaning step to be described below. A coating of more than 500 μm thick may simply add to the cost because no further improvement in corrosion resistance is expectable. The thickness of the coating is preferably 80 to 400 μm, more preferably 100 to 400 μm, and even more preferably 100 to 300 μm.

According to the invention, the surface of the yttrium-base sprayed coating is then cleaned with a preselected cleaning liquid to remove yttrium-base particles anchored thereto until the population (or number) of yttrium-base particles with a size of up to 300 nm becomes no more than 5 particles/square millimeters ($mm^2$) of the coating surface. It is, of course, most preferred that the population of yttrium-base particles with a size of up to 300 nm on the coating surface be 0. As long as the population is no more than 5 particles/$mm^2$, dusting to such an extent as to invite a substantial loss of production yield does not occur during etching treatment in the semiconductor device fabrication process. As used herein, the "size" of yttrium-base particles refers to the maximum diameter of individual particles measured by microscopy under a scanning electron microscope (SEM) or the like. As seen from the images of FIGS. 5 and 6, no or only a few particles with a size in excess of 300 nm are present on the sprayed coating surface. Removal of particles with a size of up to 300 nm means removal of substantially all inhibitory particles.

The cleaning liquid is an aqueous solution of organic acid, aqueous solution of inorganic acid or aqueous solution of mixed organic and inorganic acids. The organic acid is not particularly limited as long as it is water-soluble. Suitable organic acids include, but are not limited to, monofunctional carboxylic acids such as formic acid and acetic acid, difunctional carboxylic acids such as maleic acid, tartaric acid and phthalic acid, trifunctional carboxylic acids such as citric acid, hydroxy acids such as lactic acid, and sulfonic acids such as methanesulfonic acid. Inter alia, tartaric acid and citric acid are preferred because they are edible, nontoxic and easy to handle. The inorganic acid is not particularly limited as long as it is water-soluble. Suitable inorganic acids include nitric acid, sulfuric acid, carbonic acid, hydrofluoric acid, and acidic ammonium fluoride.

The cleaning technique is not particularly limited. Preferably, a part or component in the form of a substrate having the yttrium-base sprayed coating formed on its surface is wholly immersed in the cleaning liquid because this technique is effective and efficient. For those substrates of metallic aluminum and silicon which are readily dissolved in acid, the area of the substrate that should avoid corrosion with acid is desirably masked with resin tape or sheet when a strong acid is used for cleaning. Cleaning without masking is possible when a weak organic acid is used for cleaning, for example, a carboxylic acid or hydroxy acid such as phthalic acid, tartaric acid or citric acid. For those substrates of quart glass or $Al_2O_3$ ceramics which are acid resistant, cleaning without masking is possible even with a strong acid solution such as nitric acid. In some cases, a buffer solution based on a combination of acid and salt may be used as the cleaning liquid.

The yttrium-base sprayed coating is chemically cleaned with the cleaning liquid to dissolve a thin layer from the coating surface for removing particles with a size of up to 300 nm which become a source of dusting. The dissolution depth is preferably at least 0.01 μm from the original coating surface. Although the upper limit of dissolution depth is not critical, the dissolution depth is preferably up to 20 μm. More preferably the dissolution depth is 1 to 20 μm from the coating surface. A dissolution depth of less than 0.01 μm may be insufficient to remove particles with a size of up to 300 nm and fail to reach a population of no more than 5 particles/mm². A dissolution depth in excess of 20 μm may simply make the coating thinner without further improvements in particle removal.

After cleaning, the coating is rinsed with ultrapure water to thoroughly remove the acid and dried in vacuum or under atmospheric pressure.

When a secondary electron image (magnification ×10,000 or more) of the dry coating surface is observed under SEM, yttrium-base particles having a size of up to 300 nm on the coating surface are detectable. According to the invention, yttrium-base particles are removed from the coating surface by the cleaning step until the population of particles reaches no more than 5 particles/mm² of the surface.

EXAMPLE

Examples are given below by way of illustration and not by way of limitation.

Examples 1 to 4 and Comparative Examples 1 and 2

Preparation of Sprayed Coating

An yttrium-base sprayed coating was obtained by thermally spraying the coating material shown in Table 1 onto a surface of a substrate of the material shown in Table 1, immersing the coated substrate in a cleaning liquid, which was an aqueous solution of the cleaning agent shown in Table 1, to clean the coating surface, thoroughly rinsing with ultrapure water, and vacuum drying. The surface of the yttrium-base coating thus obtained was observed under SEM, and yttrium-base particles having a size of up to 300 nm on the surface were inspected and counted. The results are shown in Table 1 and SEM images are shown in FIGS. 1 to 6. Notably, the yttrium-base sprayed coating was formed by atmospheric plasma spraying using a gas mixture of 40 L/min of argon and 8 L/min of hydrogen.

TABLE 1

Figure 1:
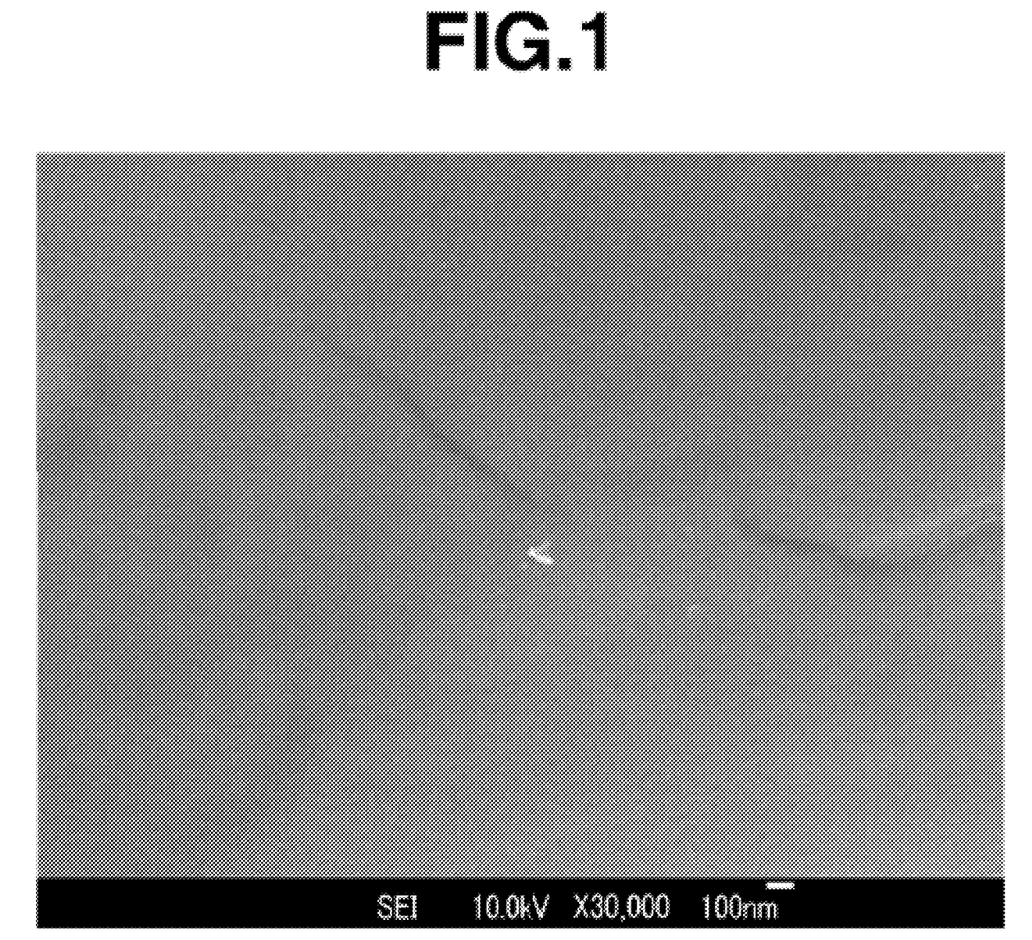
FIGS. 1, 2, 3 and 4 are SEM images of the surface of yttrium-base sprayed coatings in Examples 1, 2, 3 and 4, respectively.
Figure 2:
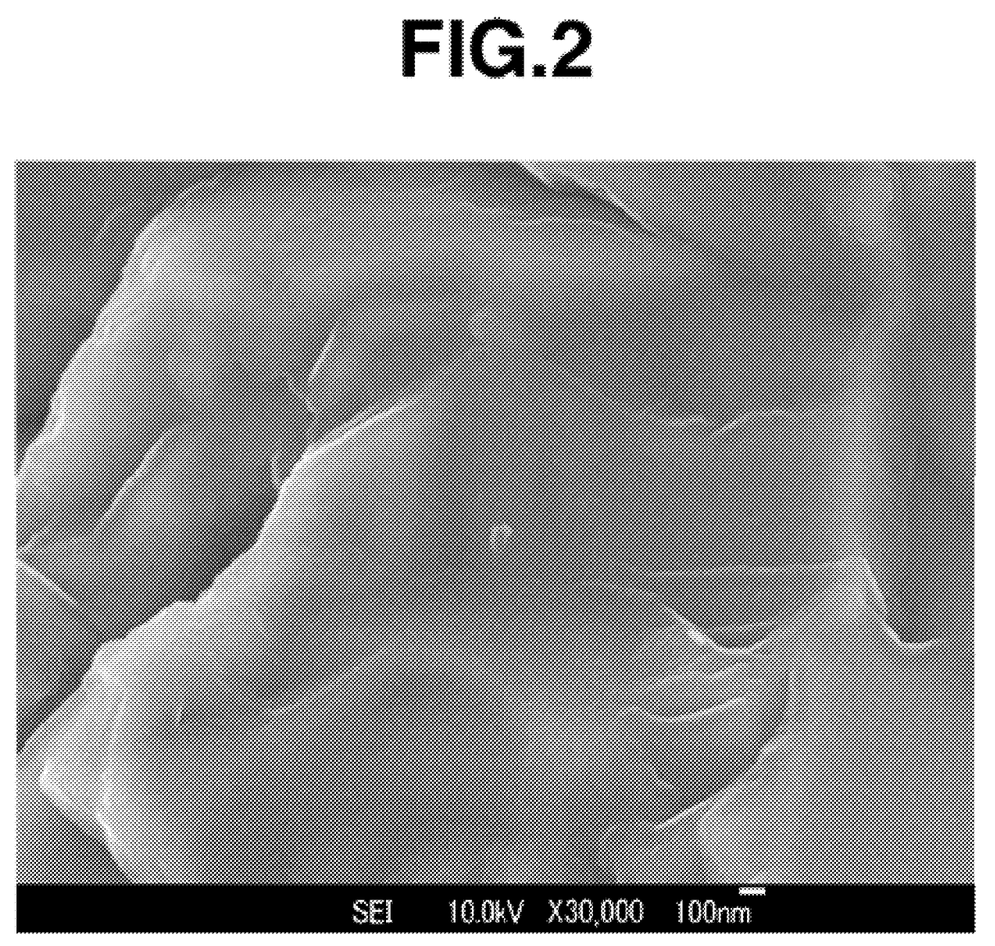
Figure 3:
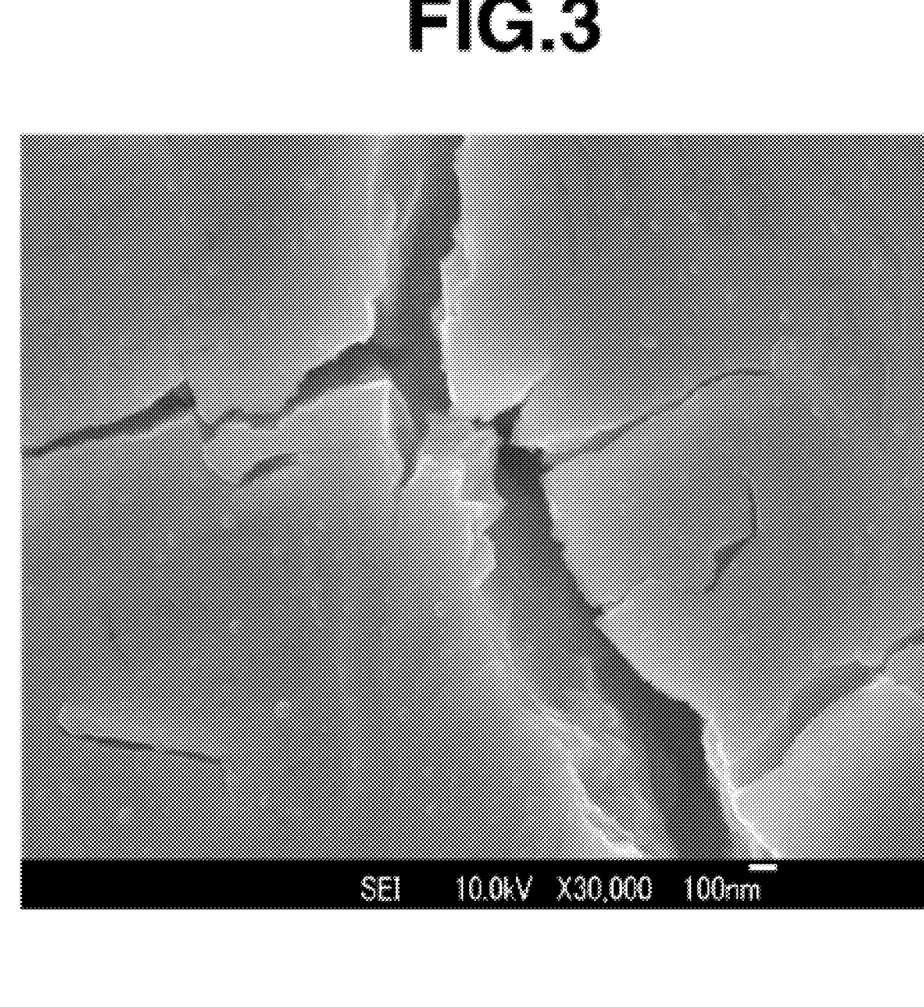
Figure 4:
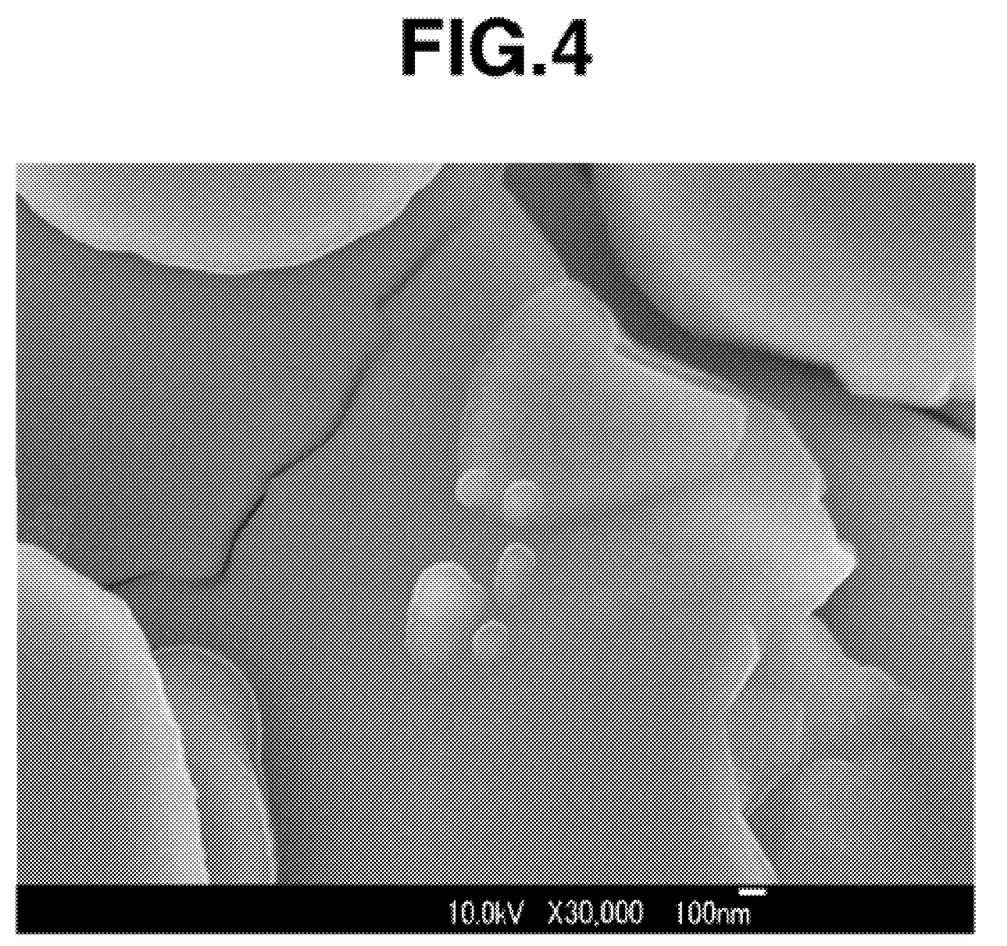
Figure 5:
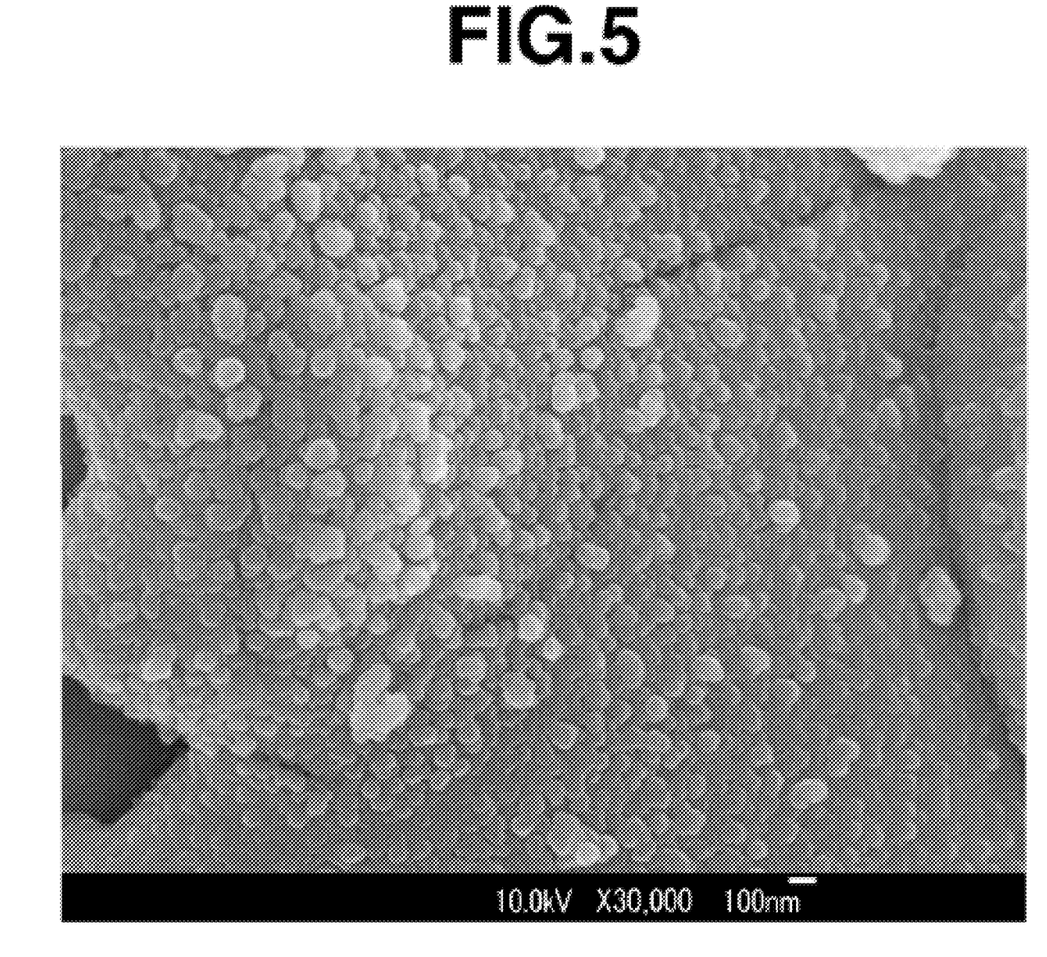
FIGS. 5 and 6 are SEM images of the surface of yttrium-base sprayed coatings in Comparative Examples 1 and 2, respectively.
Figure 6:
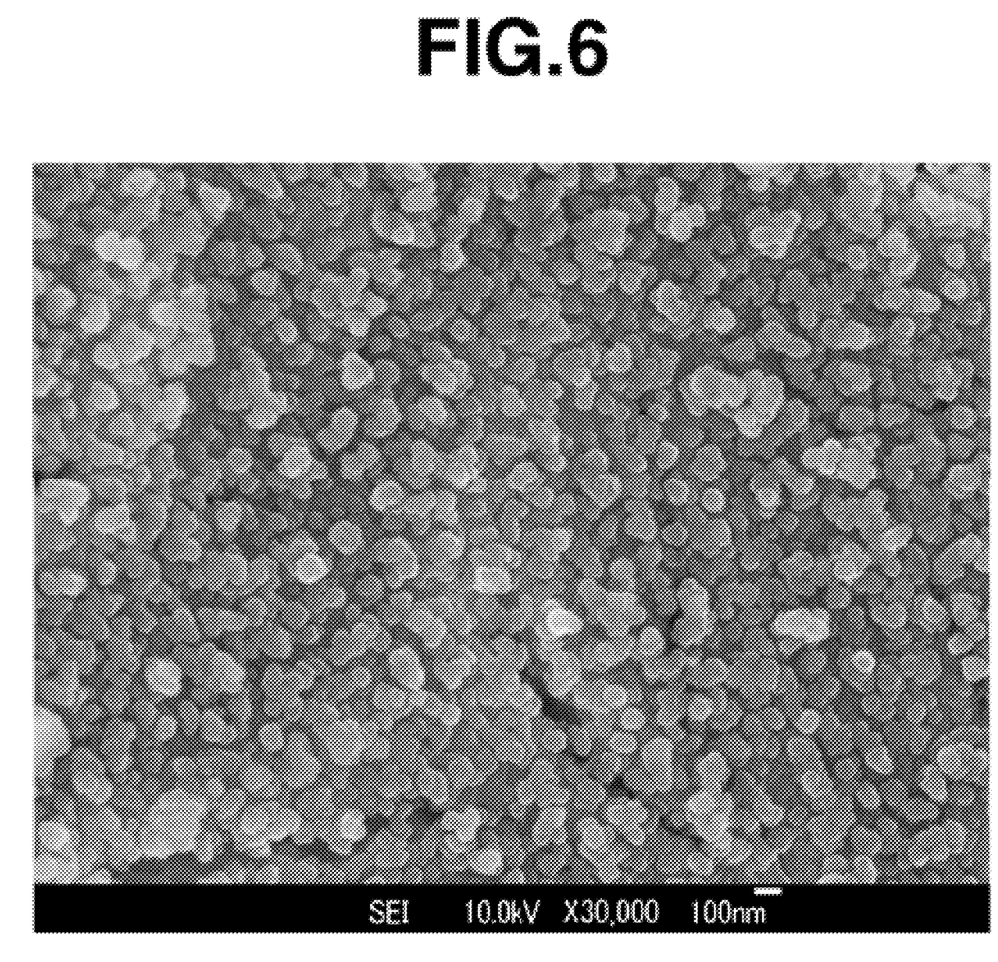

| | | Example | | | | Comparative Example | |
|---|---|---|---|---|---|---|---|
| | | 1 | 2 | 3 | 4 | 1 | 2 |
| Spray Material | | $Y_2O_3$ | $Y_2O_3 + YF_3$ | $YF_3$ | YOF | $Y_2O_3$ | $YF_3$ |
| Coating thickness, μm | | 200 | 300 | 100 | 200 | 200 | 200 |
| Substrate material | | Al | $Al_2O_3$ | Si | Al | Al | Al |
| Cleaning conditions | Cleaning agent | tartaric acid | citric acid | hydrofluoric acid + acidic ammonium fluoride | lactic acid | no cleaning | no cleaning |
| | Concentration, mol/L | 2 | 1 | 0.05 + 0.1 | 2 | — | — |
| | Temperature, ° C. | 30 | 50 | 30 | 50 | — | — |
| | Time, hr | 4 | 12 | 0.5 | 12 | — | — |
| | Dissolution depth, μm | 2 | 20 | 2 | 10 | — | — |
| Particle population on surface (particles/mm²) | | 0 | 0 | 0 | 0 | numerous | numerous |
| SEM image | | FIG. 1 | FIG. 2 | FIG. 3 | FIG. 4 | FIG. 5 | FIG. 6 |

As is evident from Table 1 and FIGS. 1 to 6, the yttrium-base sprayed coatings in Examples 1 to 4 bear no particles on their surface whereas numerous particles are on the yttrium-base sprayed coatings in Comparative Examples 1 and 2 which omit cleaning with an aqueous solution of acid or cleaning agent. It is readily presumed that these particles cause dust generation during etching treatment. When parts or components having yttrium-base sprayed coatings of Examples 1 to 4 deposited thereon are used, dusting as a result of yttrium-base particles spalling off during etching treatment in a semiconductor device fabrication process is substantially prevented. This will eventually improve the fabrication yield of semiconductor devices.

Japanese Patent Application No. 2015-151568 is incorporated herein by reference.

Although some preferred embodiments have been described, many modifications and variations may be made thereto in light of the above teachings. It is therefore to be understood that the invention may be practiced otherwise than as specifically described without departing from the scope of the appended claims.

The invention claimed is:

1. A method for preparing a yttrium-base sprayed coating, comprising the steps of:
   thermally spraying a spray material comprising particles of one or two or more selected from the group consisting of yttrium oxide, yttrium fluoride and yttrium oxyfluoride onto a substrate which is readily dissolved in acid so as to form a yttrium-base sprayed coating having a thickness of 10 to 500 μm on the substrate, and
   chemically cleaning a surface of the yttrium-base sprayed coating with a cleaning liquid composed of an organic acid aqueous solution so as to reduce a number of particles with a size of up to 300 nm which exist on the surface of the coating to not more than 5 particles per square millimeters, wherein the organic acid aqueous solution is an aqueous solution of at least one selected from the group consisting of a monofunctional carboxylic acid, a difunctional carboxylic acid, a trifunctional carboxylic acid and a hydroxy acid, or an aqueous solution of a mixture of at least two thereof.

2. The method of claim 1 wherein the monofunctional carboxylic acid is formic acid or acetic acid, the difunctional carboxylic acid is maleic acid or tartaric acid or phthalic acid, the trifunctional carboxylic acid is citric acid, and the hydroxy acid is lactic acid.

3. The method of claim 1 wherein the substrate readily dissolved in acid is selected from the group consisting of stainless steel, and aluminum, nickel, chromium, zinc and an alloy thereof, and metal silicon.

4. The method of claim 2 wherein the substrate readily dissolved in acid is selected from the group consisting of stainless steel, and aluminum, nickel, chromium, zinc and an alloy thereof, and metal silicon.

* * * * *